INVENTOR
HENDRIKUS J. KANTERS
JAN A. VAN BERGEN
BY

AGENT 3,288,337
WELDING ELECTRODES FEED APPARATUS
Jan Anthonie Van Bergen and Hendrikus Johannes Kanters, both of Emmasingel, Eindhoven, Netherlands, assignors to North American Philips Company, Inc., New York, N.Y., a corporation of Delaware
Filed Oct. 27, 1964, Ser. No. 406,835
Claims priority, application Netherlands, Nov. 15, 1963, 300,570
3 Claims. (Cl. 226—181)

The invention relates to a feed device for driving a wire or tape-shaped welding electrode.

Such devices are known. It serves for winding a welding wire off a reel and for pushing this welding wire through a guide and a welding nozzle, torch or gun towards a welding area, where the end of the welding wire is melted in an electric arc.

In the known devices the stress of the spring on the rollers is adjustable, but the rollers cannot be easily separated one from the other against the spring force in order to insert the welding wire readily between the rollers.

In accordance with the invention, a control-member is provided that can be adjusted to two positions; in one position it holds the movable roller separated from its counter-roller and in the other position it urges or draws the movable roller towards its counter-roller under an adjustable spring force.

With this construction the rollers can be easily separated one from the other by simply displacing the control-member, so that both hands are available for inserting the wire between the rollers.

In one embodiment of the invention the spring is disposed between two levers, on which the movable rollers are rotatably arranged and which are interconnected by a control-member.

A more practical and structurally satisfactory embodiment comprises a control member formed by a bar passing through openings in a pair of levers, one lever having at one end a stop supporting a lever and at the other end a handle with a crank or lug, which is adapted to co-operate with the other lever and to operate against a spring force separating the said lever and urging the rollers together.

In the device according to the invention it is important that the rollers should exert a highly effective, fairly great clamping force on the welding wire.

According to a further feature of the invention one of the rollers of each pair has a cylindrical circumferential face, whereas the other roller of each pair has a groove of a wedge-shaped section so that a welding wire can be gripped between the cylindrical face and the side walls of the groove.

In contrast to the known device, the device according to the invention is constructed so that a fixed support for the spring with its stress adjusting-member is not required, since this unit can be completely arranged between the levers. In a presently preferred embodiment of the invention for example one of the levers is provided with a member for adjusting the force which the spring is capable of exerting on the rollers, for example a sleeve displaceable with a lever and having the bar of the control-member taken through it.

The above and other features, objects and advantages of the present invention will be fully understood from the following description considered in connection with the accompanying illustrative drawings.

The invention will be described more fully with reference to the accompanying diagrammatic drawing in which.

Figure 1:
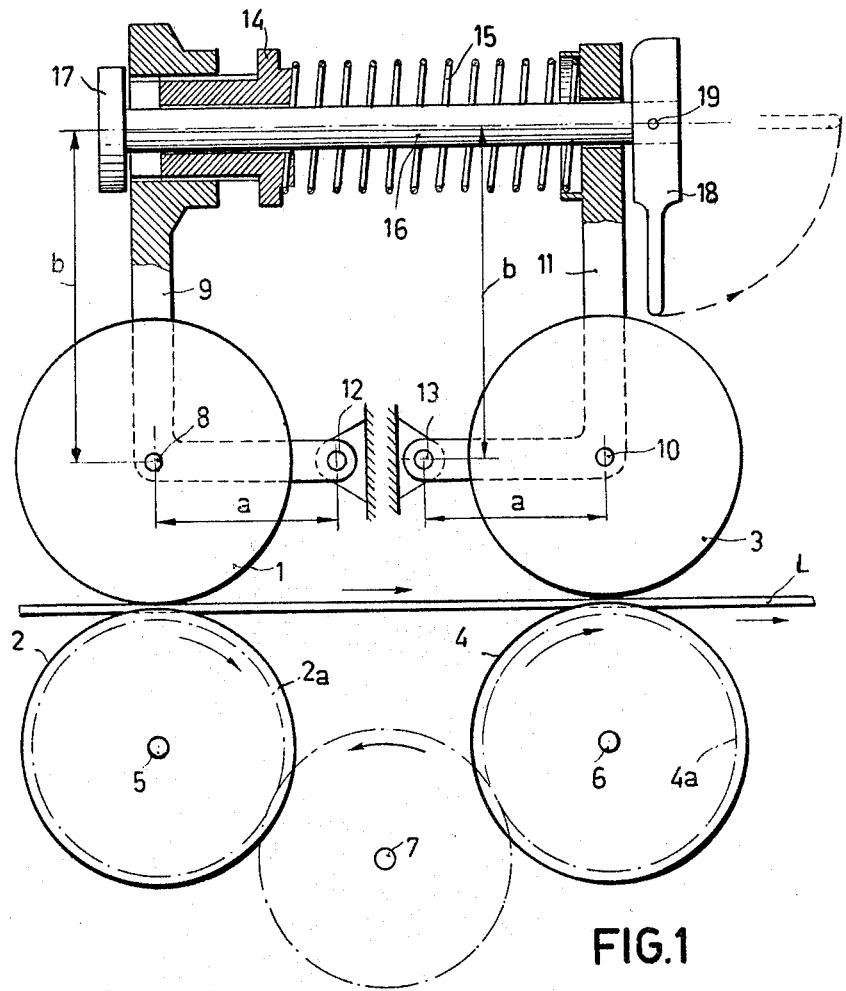
FIG. 1 is a side elevation of a device according to the invention.

A welding wire fed from a supply reel (not shown) passes from left to right in FIG. 1 between pairs of rollers 1, 2 and 3, 4. The driving roller 2 is adapted to turn about a shaft 5, about which a gear wheel $2a$ is also adapted to turn; gear wheel $2a$ is fastened to the roller 2. The driving roller 4 is adapted to turn about a shaft 6, about which a gear wheel $4a$ is also adapted to turn and which is also secured to the roller 4. The gear wheels $2a$ and $4a$, having the same shape, are driven by a gear wheel 7. Under the given conditions the gear wheel 7 rotates counter-clockwise, whereas the gear wheels $2a$ and $4a$ rotate clockwise at the same speed.

The welding wire L is carried along by the said pairs of rollers 1, 2 and 3, 4, when the rollers 1 and 3 press the welding wire with sufficient force against the driven rollers 2 and 4 respectively. The wire L is pushed in the direction indicated by the arrows towards a guide sleeve and a welding tip or a similar member (not shown).

The pressure rollers 1 and 3 have a smooth surface. The use of milled pressure rollers may cause damage to the welding wire for example by scratches, transverse grooves and ground faces. Also small metal particles are scraped from the welding wire and may raise the risk of disturbance of the welding process.

Figure 2:
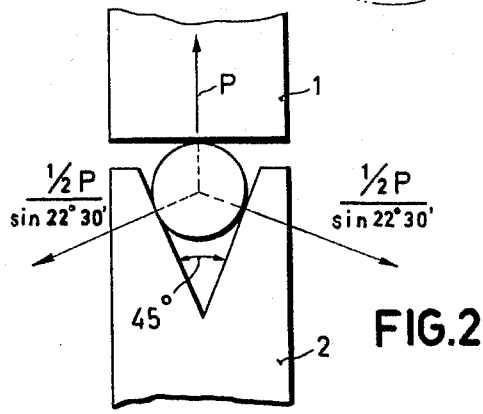
FIG. 2 is a sectional view of the area where the rollers co-operate with the wire for pushing it forwards.

The disadvantage of smooth pressure rollers resides in the comparatively low friction co-efficient between the welding wire and the pressure roller. This disadvantage is obviated by providing in the lower driven rollers a smooth V-shaped groove of 45°, which is shown in a sectional view at right angles to the welding wire in FIG. 2. When the pressure roller exerts, through the welding wire, a pressure force P on the driven roller, the welding wire is pressed against each of the sides of the V-shaped groove by a force equal to $\frac{1}{2}P/\sin 22°.30'$. When the pressing force P remains the same the groove provides a pushing force on the wire raised by a factor $$1/\sin 22°.30' = 2.6$$

Hereinafter it will be explained how the pressing forces can be transferred to the welding wire and how the value of the pressing forces can be varied.

From FIG. 1 it is apparent that pressure roller 1 is adapted to rotate about the shaft 8, supported on a right angle lever 9. The pressure roller 3 is likewise rotatable about the shaft 10, connected with an angular lever 11. The two levers are pivotal about the shafts 12 and 13 respectively. At the other end of the lever 9 there is provided an enlargement or boss having a tapped hole for accommodating a spacing sleeve 14, provided with an external screw thread. Between the spacing sleeve 14 and the lever 11 there is mounted a pressure spring 15. This spring exerts a force to the left on the lever 9, which force tends to turn the lever in anti-clockwise direction. The spring exerts on the lever 11 a force to the right of equal value. This force tends to turn the lever 11 in clockwise direction about the shaft 13. The pressure rollers 1 and 3 are therefore moveable about pivots 12 and 13 downwardly and are rotatable about the shafts 8 and 10 respectively. Thus the welding wire L is urged into the V-groove by the lower rollers 2, 3 by the rollers 1, 4. Under the action of the reactive forces of the welding wire on the pressure rollers 1 and 3 and by the spring pressure from spring 15, the levers 9 and 11 tend to occupy a position in which the sum of the torques of these forces with respect to each fulcum becomes equal to zero.

It will now be explained with reference to FIG. 1 how the welding wire is introduced between the pressure rollers. Use is made to this end of a draw rod 16, which interconnects the two levers 9 and 11, and passes through the spacing sleeve 14 and the pressure spring 15. At the left-hand end of the draw rod there is provided a disc 17 forming a stop and at the right-hand end there is provided a crank 18, which is adapted to rotate about a pin 19. During the welding operation the crank is in a vertical "free" position shown. The draw rod, in this position of crank 18 is not under stress and cannot exert any influence on the position of the mechanism described. When the crank 18 is turned in anti-clockwise direction into the horizontal position (indicated by broken lines), the levers 9 and 11 are turned about 12 and 13 towards each other against the spring pressure. The pressure rollers 1 and 3 are lifted, thus separating rollers 1, 2 and 3, 4, so that the welding wire can be easily introduced between the pressure rollers.

This mechanism has inter alia the following advantages:

(1) When the lever arms $a$ and $b$ are equal, the rollers 1 and 3 exert equal pressing forces on the welding wire L.

(2) The values of these pressing forces can be accurately adjusted by controlling the spring pressure. It will be seen from FIG. 1 that by turning the spacing sleeve 14 the length of the pressure spring can be varied.

(3) After the re-insertion of a welding wire and after the crank has been moved into its "free" position, the pressing forces are again equal to each other, when the diameters of the wire are the same, as in the initial state.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. Welding electrode feed apparatus comprising a first and second pair of roller members, one roller of each pair of said roller members being a driven roller and the other roller of said members being a pressure roller; lever system means including a pair of angular levers pivotal about one end, each said lever having an arm portion at the other end for normally supporting said pressure roller of said roller members in a position of circumferentially forced engagement with the associated driven roller, and control means operatively connected with said lever system means for moving said lever system means into a position for displacing the pressure rollers of said pair of roller members relative to said driven rollers whereby the rollers of each said roller member are in spaced apart relation, said control means including an aperture through each said arm portion, a rod member extending between said arm portions and through said apertures and having stops at the extremities of each end thereof, a spring urging said arm portions against said stops, and means for urging said arm portions toward one another against the force of said spring whereby the rollers of each said roller member are separated.

2. Welding electrode feed apparatus according to claim 1, wherein each said lever comprises said arm portion and a second arm portion disposed at substantially a right angle thereto; said pressing roller being supported on said lever at the juncture of said arm portions.

3. Welding electrode feed apparatus according to claim 2 wherein said driving rollers have a V-shaped annular groove in the circumference of said rollers.

References Cited by the Examiner

UNITED STATES PATENTS

| | | | |
|---|---|---|---|
| 1,637,658 | 8/1927 | Rose | 226—187 X |
| 2,613,706 | 10/1952 | Smith | 226—186 X |
| 2,826,948 | 3/1958 | Veale | 226—182 X |
| 2,846,217 | 8/1958 | Bormann | 226—187 X |
| 3,010,565 | 11/1961 | Pasinski | 226—194 X |

M. HENSON WOOD, JR., *Primary Examiner.*

R. A. SCHACHER, *Assistant Examiner.*